United States Patent
Willis (10) Patent No.: US 6,693,857 B1
(45) Date of Patent: Feb. 17, 2004

(54) DATA BUFFER MANAGEMENT TO ENABLE APPARENT SIMULTANEOUS RECORD AND PLAYBACK FROM A REWRITABLE DIGITAL DISK

(75) Inventor: Donald Henry Willis, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/434,188

(22) Filed: Nov. 4, 1999

(51) Int. Cl.[7] .......................... G11B 7/085; G11B 7/005
(52) U.S. Cl. ................. 369/30.23; 369/47.3; 369/47.33
(58) Field of Search .......................... 386/77, 82, 91, 386/125, 126; 369/30.23, 47.3, 47.32–47.34; 711/4, 113, 120, 168

(56) References Cited

U.S. PATENT DOCUMENTS

| | | | | |
|---|---|---|---|---|
| 5,212,678 A | * | 5/1993 | Roth et al. | |
| 5,214,631 A | * | 5/1993 | Maeda et al. | |
| 5,432,614 A | * | 7/1995 | Yamamoto | |
| 5,608,697 A | * | 3/1997 | De Haan et al. | |
| 5,905,864 A | * | 5/1999 | Terasima et al. | 711/168 X |
| 6,178,147 B1 | * | 1/2001 | Fujinami | |
| 6,181,653 B1 | * | 1/2001 | Wada et al. | |
| 6,240,244 B1 | * | 5/2001 | Ikeda | 386/125 |

FOREIGN PATENT DOCUMENTS

| | | |
|---|---|---|
| EP | 0651391 | 5/1995 |
| EP | 0677961 | 10/1995 |
| EP | 0695098 | 1/1996 |
| EP | 0696798 | 2/1996 |
| EP | 0725399 | 8/1996 |
| EP | 0737975 | 10/1996 |

* cited by examiner

Primary Examiner—W. R. Young
(74) Attorney, Agent, or Firm—Joseph S. Tripoli; Joseph J. Laks; Harvey D. Fried (57) ABSTRACT

A method for managing buffers in an apparatus adapted for writing program portions onto and reading the program portions from a digital program disk comprises the steps of: filling a first buffer with encoded program portions at a first bit rate; filling a second buffer with the encoded program portions; supplying the encoded program portions from the second buffer for decoding; and, establishing an initial complementary fullness of the first and second buffers using an excess bit rate capability of the apparatus related to the first bit rate. The first bit rate is a constant bit rate slower than one-half of a maximum bit rate of the apparatus. An apparatus for implementing the method comprises a controller for recording the program portions onto alternate segments of the track, for initiating complementary operation of record and track buffers and for maintaining the complementary operation.

29 Claims, 9 Drawing Sheets

ALTERNATE RECORDING/PLAYBACK

| PLAYBACK | LINES | RECORD | LINES |
|---|---|---|---|
| SEGMENT A | 1-43, ODD | SEGMENT A | 1-43, ODD |
| SEGMENT B | 2-44, EVEN | SEGMENT B | 2-44, EVEN |
| SEGMENT C | 3-45, ODD | SEGMENT C | 3-45, ODD |
| SEGMENT D | 4-46, EVEN | SEGMENT D | 4-46, EVEN |
| ⋮ | ⋮ | SEGMENT E | 5-47, ODD |
| | | ⋮ | ⋮ |

FIG. 13

PRECESSION

| PATTERN | FIRST SEGMENT RECORDED |
|---|---|
| A | 1 |
| B | 2 |
| C | 3 |
| D | 4 |
| E | 5 |
| ⋮ | ⋮ |

FIG. 14

DATA BUFFER MANAGEMENT TO ENABLE APPARENT SIMULTANEOUS RECORD AND PLAYBACK FROM A REWRITABLE DIGITAL DISK

BACKGROUND OF THE INVENTION

This invention relates generally to methods and apparatus providing advanced operating features for audio and/or video programs recorded on disk media.

Various devices have been developed to enable consumers to record video and audio programs for later presentation. Such devices include tape recorders, video cassette recorders, recordable compact disks, hard drives and most recently, recordable digital video disks (DVD). A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded, that is overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technology. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and without any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

A desirable feature in a DVD device would enable a viewer and/or listener to initiate resumption of the program presentation as soon as the interruption or pause has ended, without sacrificing the program content during the interruption or pause.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales. Such novel DVD features should include the ability to simultaneously view and record on a disk medium in a seamless fashion, without the high operating speed of a computer hard drive. A recordable DVD device with a single head for reading and writing cannot read and write simultaneously. Accordingly, the terms seamless and simultaneous are used herein to denote that recording and playing back program material in accordance with the inventive arrangements has the appearance of being simultaneous to the viewer and/or listener, even though the functionality is actually alternating or multiplexed.

Another issue relates to the number of times program material can be recorded and re-recorded on disk media, particularly the same DVD. Persistent recording in the same section of the disk will exhaust the lifetime of the disk prematurely. It is desirable when implementing novel features, particularly features that can require large amounts of overwriting, to prevent persistent recording in the same sections of a rewritable DVD to prevent premature exhaustion.

Another issue relates to the maximum data rates of minimally capable rewritable DVD devices. A basic rewritable DVD device, having for example a 1×(one times) read and a 1×(one times) write capability, typically has maximum data rates for recording or playing back of approximately 11 megabits/second. Accordingly, it is desirable to implement novel features that can be implemented within the constraints of the maximum available data rates.

SUMMARY OF THE INVENTION

A method in accordance with the inventive arrangements for managing buffers in an apparatus adapted for writing program portions onto and reading said program portions from a digital program disk, comprises the steps of: filling a first buffer with encoded program portions at a first bit rate; filling a second buffer with said encoded program portions read from said digital program disk; supplying said encoded program portions from said second buffer for decoding; and, establishing an initial complementary fullness of said first and second buffers using an excess bit rate capability of said apparatus related to said first bit rate.

Another method in accordance with the inventive arrangements for initiating apparently simultaneous recording on and playing back from a digital program disk, comprises the steps of: buffering program portions before writing the program portions onto the digital program disk; buffering the program portions after reading from the digital program disk; upon receiving a command, jumping a read/write pickup assembly between first and second locations spaced from one another along a track of the digital program disk; during the jumping, accumulating the program portions not yet written onto the digital program disk during the first-mentioned buffering step; after the jumping, initiating reading and accumulating at least one of the program portions read from the digital program disk during the second-mentioned buffering step; and, accumulating a predetermined sum of the program portions during both the buffering steps.

The predetermined sum of program portions is maintained during the buffering steps by complementary operation. When program portions are accumulated during the first-mentioned buffering step, program portions are depleted during the second-mentioned buffering step. Similarly, when program portions are accumulated during the second-mentioned buffering step, program portions are depleted during the first-mentioned buffering step.

An apparatus in accordance with the inventive arrangements for alternately writing onto and reading program portions from a digital program disk during apparently simultaneous recording and playing back, comprises: a first signal processing path for receiving and encoding the program; a read/write pickup assembly for writing encoded program data onto the digital program disk and reading encoded program data from the digital program disk; a servo system for the pickup assembly; a second signal processing path for decoding and playing back the encoded program; a first buffer for storing encoded program portions ready to be written onto the digital program disk; a second buffer for storing encoded program portions read from the digital program disk; and, a controller having a first mode of operation for recording the program portions onto alternate segments of the track, during which the first buffer is free running, a second mode of operation for initiating complementary operation of the first and second buffers during and after a jump by the pickup assembly and a third mode of operation for maintaining the complementary operation.

A predetermined sum of program portions stored in the buffers is established during the second mode of operation and maintained during the third mode of operation. When program portions are accumulated in the first buffer, program portions are depleted from the second buffer. Similarly, when program portions are accumulated in the second buffer, program portions are depleted from the first buffer.

In accordance with the inventive arrangements, a read/write pickup assembly for a digital program disk, for example a rewritable DVD device, can make long jumps between locations spaced from one another along a track of a digital program disk. This is useful, for example, during the course of simultaneously recording and playing back the same program or playing back a first program and recording another program. Such a feature advantageously enables the switching between writing onto the DVD and reading from the DVD to be multiplexed in such a way as to be transparent to the viewer and/or listener. Even though a single pickup assembly cannot write and read simultaneously, the recording and playing back can be made to appear simultaneous by advantageous management of buffers in the input and output signal processing paths. Simultaneous recording and playing back is a very desirable feature that enables several advantageous modes of operation. One such mode is a record during pause and play, which can also be referred to as a pause during record and play. Another such mode is recording a first program while viewing a second program, utilizing the same DVD.

The inventive arrangements are also applicable to related kinds of disk media, for example rewritable CD-ROM and computer-type hard drives.

DETAILED DESCRIPTION OF THE PREFERRED EMBODIMENTS

Figure 1:
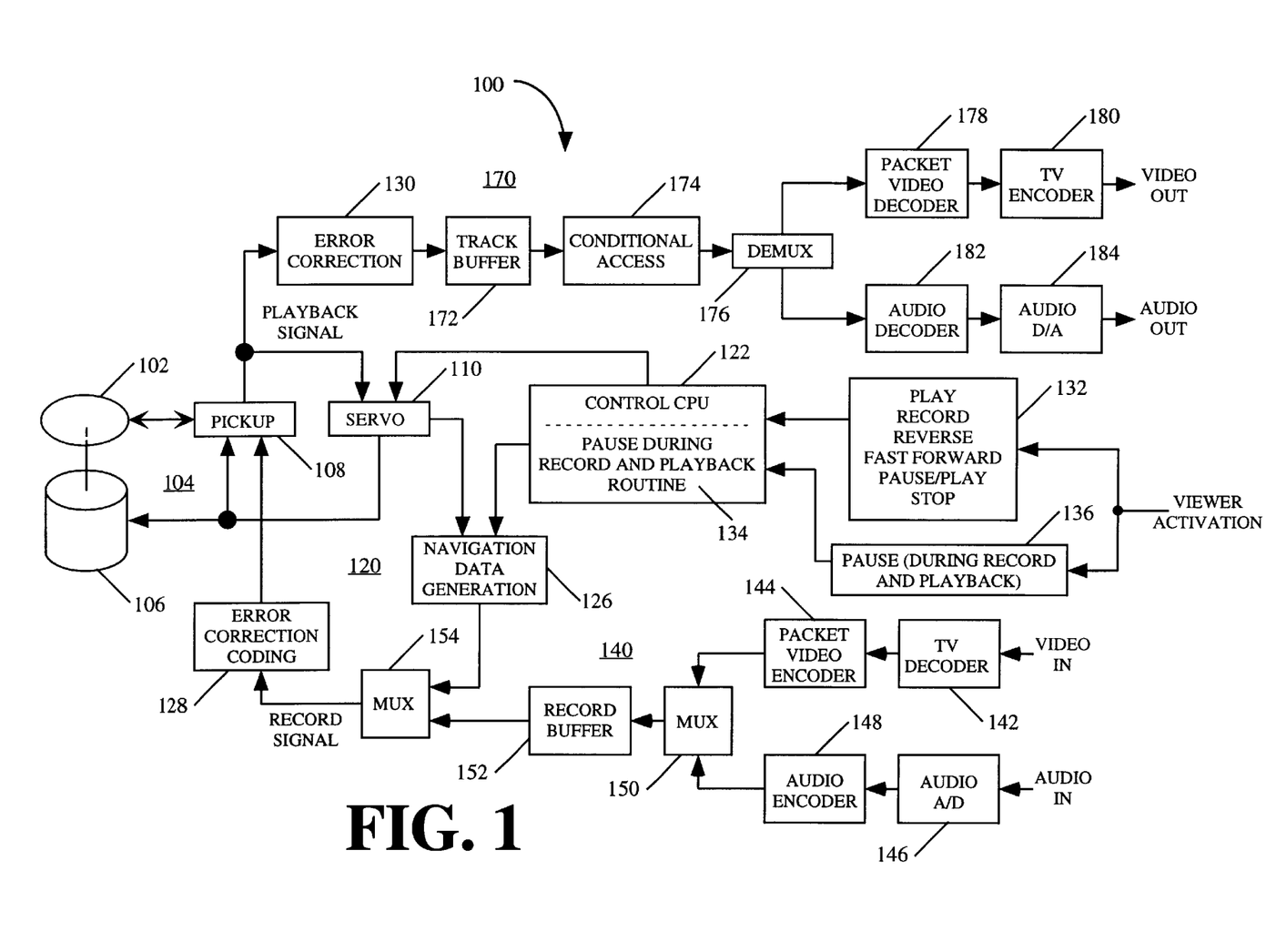
FIG. 1 is a block diagram of a rewritable DVD device having a record during pause and playback function in accordance with the inventive arrangements.

A device 100 for implementing a record during pause and playback utilizing a rewritable disk medium 102 in accordance with the inventive arrangements is shown in block diagram form in FIG. 1. The rewritable disk medium 102 is embodied as a rewritable DVD. The device 100 is capable of writing onto and reading from the rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disk. A laser on the pickup assembly burns spots onto a spiral track on the disk or illuminates spots already burned onto the track for recording and playing back video and/or audio program material. For purposes of understanding the invention, it is irrelevant whether the disk is recordable on one or two sides, or in the event of a double-sided recording, whether the double-sided recording, or subsequent reading from the disk, takes place from the same side of the disk or from both sides. The pickup and the motor are controlled by a servo 110. The servo 110 also receives the Playback Signal of data read from the spiral track of the disk 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

A control buffer 132 for viewer activatable functions indicates those functions presently available, namely play, record, reverse, fast forward, pause/play and stop. The pause is a counterpart to pause operation in a VCR, for example interrupting the play back of a prerecorded program or interrupting the recording of a viewed program to eliminate commercials from the recording. A special record during pause and playback function, labeled Pause (during Record and Playback), is illustrated as part of a separate buffer 136 to emphasize this aspect of the inventive arrangements.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

As a practical matter, the smallest addressable unit on the spiral track of the disk is an ECC (error correction code) block of 16 sectors, where each sector includes 2048 bytes of user data. A group is an integer number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises a track buffer, or output buffer, 172, in which data read from the disk is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

In accordance with the inventive arrangements, the record buffer 152 in input path 140 is advantageously much larger than would otherwise appear to be necessary. In the presently preferred embodiment, the record buffer is sufficiently large enough to store approximately 1.5 seconds of a video and audio data presentation. Also in accordance with the inventive arrangements, the track buffer 172 in output path 170 is also advantageously much larger than would otherwise appear to be necessary. In the presently preferred embodiment, the track buffer is also sufficiently large to store approximately 1.5 seconds of a video and audio data presentation. The larger record and track buffers are advantageously provided to accommodate the longest possible jumps of the pickup assembly 108 during recording and playing back in accordance with the inventive arrangements. As will be explained in further detail, the longest possible jumps of the device 100 are approximately 0.9 seconds. The cost of the improved features taught herein thus advantageously has a minimal impact, if any, on the cost of manufacturing an improved rewritable DVD device.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

Device 100 can represent a machine having, for example, a 1× read and 1× write capability. Such devices can typically have maximum data rates for recording or playing back of approximately 11 megabits/second. In order to implement the record during pause and playback function, it is necessary to play back (read) and record (write) in a manner that appears to be simultaneous. The maximum data rates available of approximately 5 megabits/second for playing back (reading) and 5 megabits/second for recording. Such rates are only half the minimum rate of a machine of minimal capability, and accordingly, apparently simultaneous playing back and recording with such a machine would seem to be impossible. Nevertheless, such a minimal capability machine can be advantageously operated in accordance with the inventive arrangements to provide apparently simultaneous playing back and recording as is necessary to implement the record during pause and playback function by advantageous management of the record and track buffers. It will also be appreciated that the inventive arrangements can also be useful for devices having higher data rates.

A record during pause and playback (or pause during record and playback) feature is very desirable in a rewritable DVD device. Such a function can be utilized, for example, when a viewer is watching a television program and is interrupted by a visitor or a phone call. During the time the viewer is unavailable, the recorder continues to record the program. After some period of time, for example anywhere from one or two minutes to 30 minutes or longer, the viewer will want to resume viewing the program from the point at which viewing was interrupted. At this point, the device must start playing back the recording from the beginning of the pause, while continuing to record the incoming program material.

This apparently simultaneously playing back and recording would normally require large jumps between the recording area and the playing back area of the spiral track, which would need to be made repeatedly as often as the video recorder alternated between playing back and recording. It should be emphasized that when the jumps occur, neither reading nor writing can occur. Thus, jumps of any kind cause the average bit rate to decrease. The longer jumps are and the more frequently jumps occur, the greater the decrease in the average bit rate.

In accordance with the inventive arrangements, a method is provided for recording and playing back after a pause that advantageously minimizes the amount of time that neither writing nor reading can occur. The method thus advantageously minimizes the length and the number of long jumps as much as possible without precluding implementation of the record during pause and playback feature. Innovative buffer management and bit rate management can compensate for those jumps that cannot be avoided. The feature is thus more tolerable to the viewer because the playback can be substantially, if not completely seamless. During a pause, program material is advantageously recorded in short segments, for example equivalent to two or three rotations of the disk, leaving spaces in between the segments that are at least as long or slightly longer than the recorded segments. When the pause ends, a jump back can be made to the start of the recording corresponding to the beginning of the pause, so that the recording can begin playing back. As each of these recorded segments is played back, the spaces in between the recorded segments can be used to record the incoming program material. Eventually, another jump back must be made after another time interval equal to the original pause has passed. In this way, potentially long jumps can advantageously be avoided except for those jump backs made at the period of the pause. In other words, if a pause is 10 minutes long, then the playback after the pause terminates will require a jump back long enough to accommodate 10 minutes of recorded program material. Such a jump back will be necessary every 10 minutes until the recording and playback of the program is complete. Buffer memories of sufficient length can advantageously be used to store the encoded program material that is waiting to be recorded while reading played back material off of the disk, and for supplying played back material to the decoders while material is being recorded on the disk. The buffers are also used to play back and record program material during the jumps. At the same time, the bit rates of the encoder and decoder can be controlled during implementation of the feature to provide sufficient bit rate capability to implement the desired buffer management. The encoders and decoders can operate, for example, according to the MPEG-2 standard.

Figure 2:
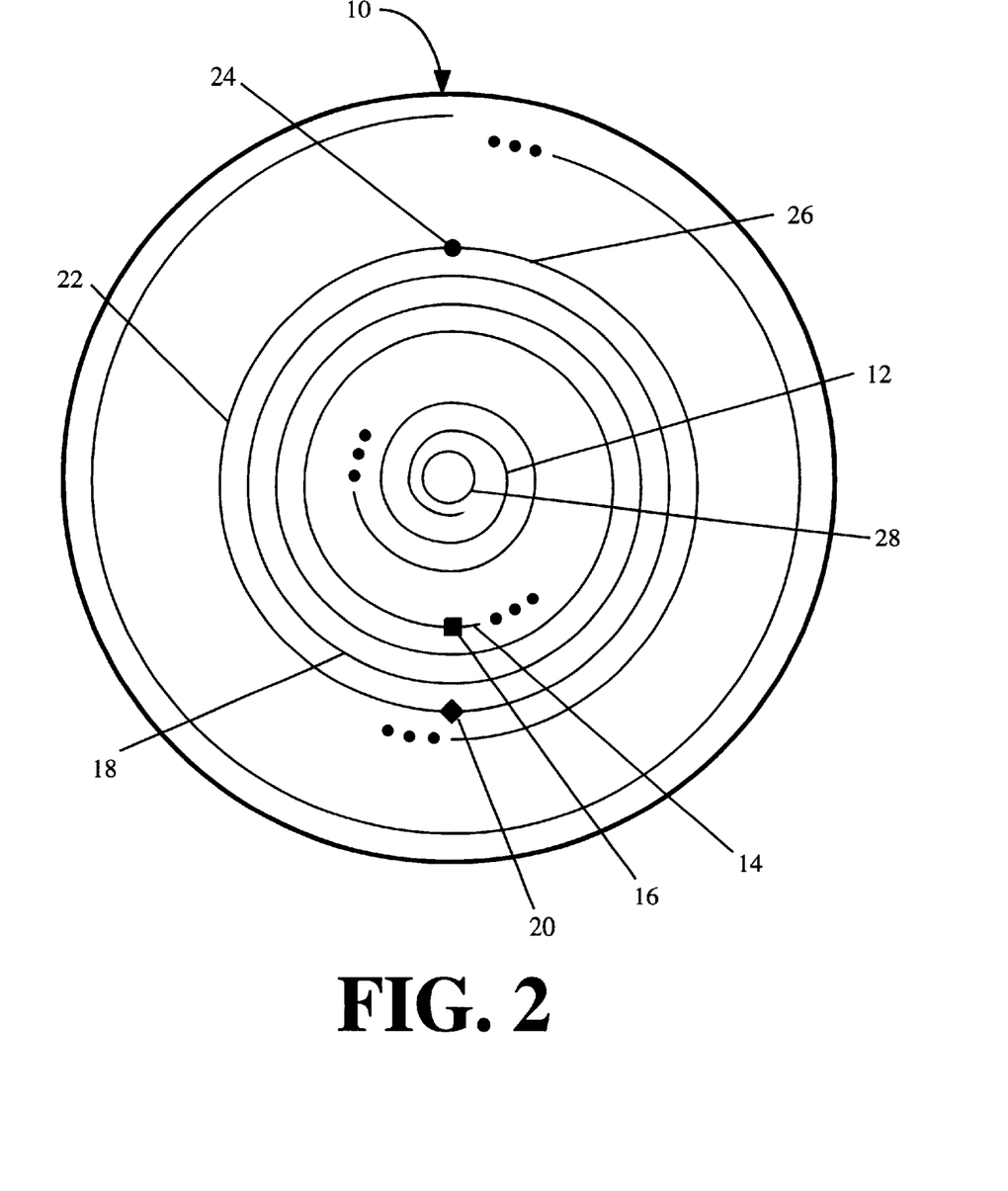
FIG. 2 is a diagram useful for illustrating how recordable segments in accordance with the record during pause and playback function of the inventive arrangements relate to a spiral track on a rewritable DVD.

For purposes of the inventive arrangements, program material is recorded onto a rewritable DVD and played back from a rewritable DVD in segments as noted above. Each segment represents a certain linear length or interval of the spiral track, as illustrated in FIG. 2. A rewritable DVD 10 is suitable for use as disk 102 in device 100. The disk has a continuous spiral track 12 that begins near a hole 28 in the middle of the disk and spirals outwardly. The track may also have a side-to-side wobble, not shown in the drawing, to accommodate media type indexing. Due to difficulties of scale only portions of the track 12 are shown, and these are shown in greatly enlarged scale. The direction of recording on the track is typically outwardly along the track, from a smaller radius part to a larger radius part. The several series of three large dots (•••) denote portions of the track not shown in the drawing.

Reference numeral 14 denotes a recorded segment during a pause, in accordance with the inventive arrangements. Square 16 denotes the end of the recorded segment. Square 16 also denotes the beginning of an unrecorded segment 18. The end of the unrecorded segment 18 is denoted by diamond 20. Diamond 20 also denotes the beginning of an optional guard band 22, which can be shorter than the recorded and unrecorded segments. The end of the optional guard band 22 is denoted by circle 24. Circle 24 also denotes the beginning of the next recorded segment 26. The guard band can be provided to assure that segments are not unintentionally overwritten if the rewritable DVD device cannot switch quickly enough between playing back and recording. Operation without the guard band is preferable, when not needed, in order not to lose recording capacity.

Figure 3:
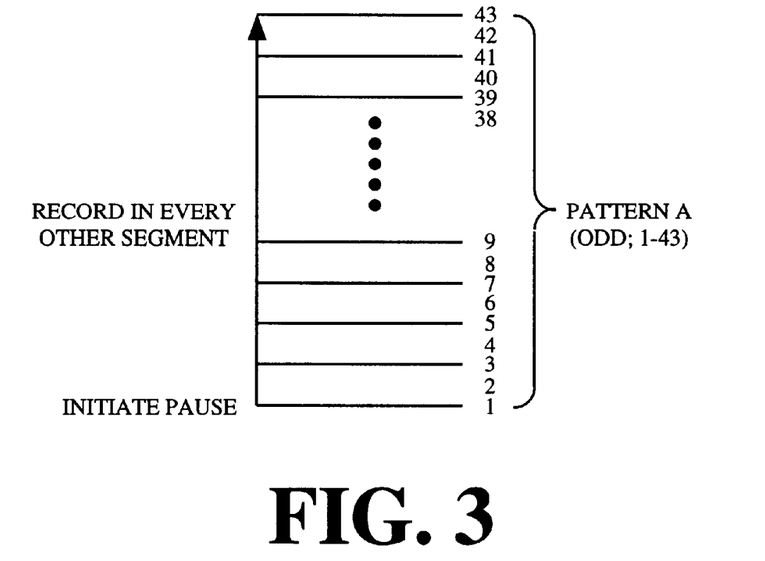
FIGS. 3–12 sequentially illustrate a method in accordance with the inventive arrangements for implementing a record during pause and playback function in accordance with the inventive arrangements.

The pause-while-recording method is sequentially illustrated in FIGS. 3–14. The numbered horizontal lines or spaces represent segments of the spiral track. The first numbered segment is not necessarily the first segment on the track, but is the first segment recorded when the pause function has been initiated. As shown in FIG. 3, segment 1 corresponds to initiating the pause. Thereafter a pattern A of alternating recorded and unrecorded segments is made on the track. The recorded segments are the odd numbered segments 1–43. The even numbered segments 2–42 are unrecorded. Guard bands are not illustrated, but can be considered to be an unrecorded segment that is longer than a recorded segment. Twenty-two segments are shown as being recorded in FIG. 3. Each segment represents approximately 0.5 seconds of program material, and accordingly, the illustrated pause is approximately 11 seconds in length. Irrespective of the length of the pause, pattern A continues until the pause is terminated. If the viewer fails to terminate the pause, a control routine can be provided to terminate the pause, for example when the last segment on the track has been recorded or the program ends.

Figure 4:
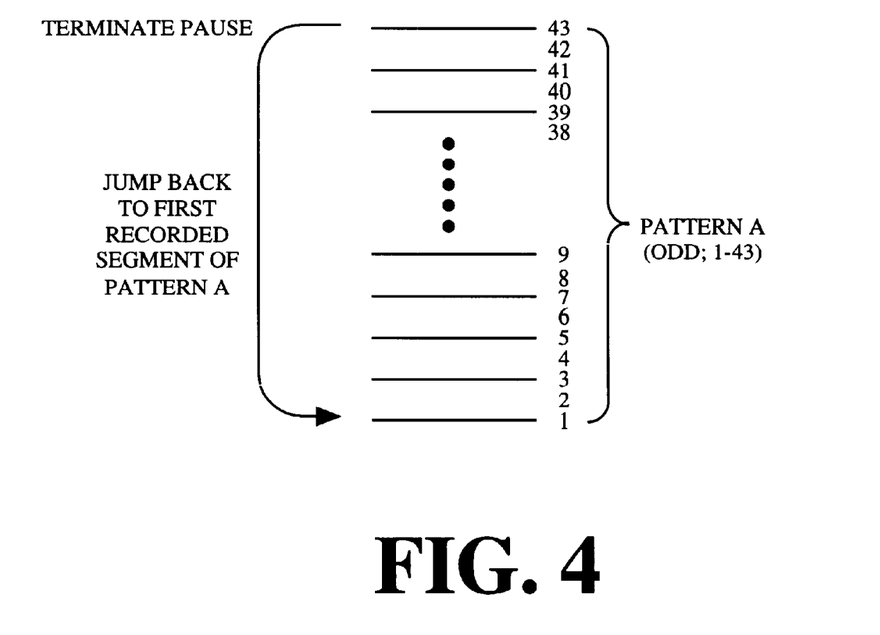

When the pause is terminated as shown in FIG. 4, the device must first finish writing of the segment being written onto the disk medium before jumping. The last recorded segment in FIG. 3 is segment 43. If the termination occurs during the skipping of segment 42, for example, then segment 43 must be recorded in full. The pickup assembly jumps back to segment 1. After this jump, it is desirable to begin playing back while recording, in such a way that no program material is lost. This requires an initialization of the innovative buffer management method. Understanding this method requires an appreciation of the starting conditions of the device when the pause is terminated. During recording, no program material is being read from the disk medium. No program material is thus available to be written into the track buffer 172, and no program material is available to be read out of the track buffer and played back to the viewer through the playback path 170. In short, the track buffer 172 is empty. At the same time, encoded program material is being propagated through the record buffer 152 and written onto the disk as quickly as the alternating pattern and the bit rate permit. The peak bit rate in the illustrated embodiment is 11 megabits/second. Accordingly, the record buffer 152 is empty or nearly empty.

In order for the alternate reading and writing of the disk medium to occur during apparently simultaneously playing back and recording of the program material, the track buffer must have enough program material stored therein to be played back during writing onto the disk medium. Similarly, the record buffer must be sufficiently empty to store enough program material when data is being read from the disk medium to avoid losing data. In accordance with the inventive arrangements, it has been determined that respective input and output path buffers are needed capable of storing three segments of program material, equivalent to approximately 1.5 seconds of program material. Buffers of this size will enable seamless operation of the pause during record and playback feature in device 100, and other devices of comparable data rates.

At the instant a pause is terminated, the necessary buffer conditions are not satisfied. Moreover, some bit rate capability must be available to initialize the buffers after the pause is terminated. Accordingly, once the pause is initiated the bit rate for the encoder is set to a constant bit rate. The decoder must decode at a rate corresponding to the bit rate during encoding, and accordingly, the decoder will automatically operate at the encoding frequency and need not be set to a specific value. In the presently preferred embodiment the constant bit rate is 5 megabits/second, in each case. This leaves approximately 1 megabit/second of bit rate capability (11 megabits/second less 2×5 megabits/second) to control the buffers.

Figure 5:
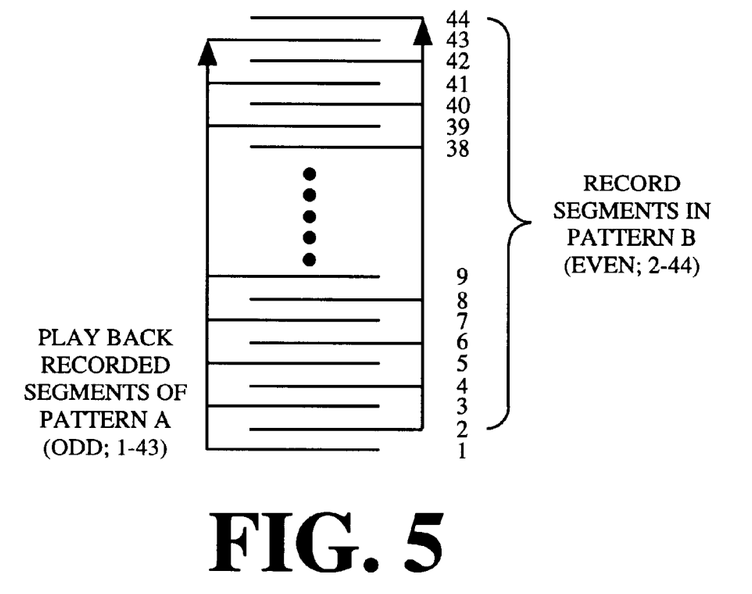

The jump after termination of the pause is illustrated in FIG. 4. This jump can be thought of as the first jump. As soon as the first jump commences, writing onto the disk medium is not possible. However, the encoder still provides an output, although at the reduced and constant bit rate of 5 megabits/second. Accordingly, program material that will become segments of pattern B illustrated in FIG. 5 are sequentially stored in the record buffer 152. As soon as the jump ends, and while the record buffer continues to fill, the first segment of pattern A is read from the disk medium and stored in the track buffer 172.

The extra bit rate capability enables a steady state of buffer operation to be reached, wherein filling and emptying of the record and track buffers is always complementary. In other words, the input buffer is filled as the output buffer is emptied, and vice versa. Also, the sum of the data in the two buffers, as a percent of capacity, is always substantially constant. If one buffer is ⅓ full, for example, the other buffer is ⅔ full. If one buffer is ½ full, the other buffer is also ½ full. If each of the buffers can hold three segments, as in the presently preferred embodiment, the sum of the number of segments in both buffers at the same time must be constant and must be equal to three.

FIG. 5 illustrates reading the segments 1–43 of pattern A and writing the segments 2–44 of pattern B, which occurs in an alternating sequence once the steady state operation of the buffers has been achieved.

Figure 6:
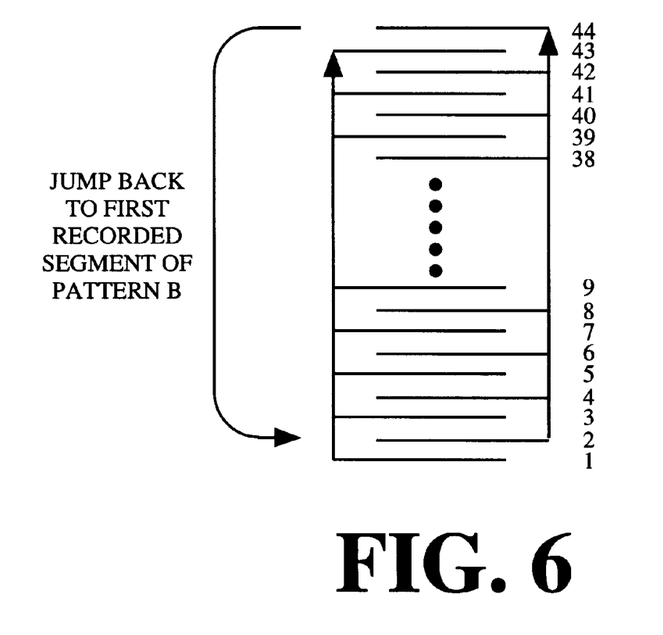

FIG. 6 represents a second jump back, and in fact, represents all remaining jumps back. When the first jump occurs from segment 43 to segment 1, the buffers are not initialized. When the second jump occurs from segment 44 to segment 2, the buffers are already initialized and operating in a complementary manner. Accordingly, after the second jump commences, the track buffer is full enough for segments to be read out and for playback to continue uninterrupted, that is seamlessly, during the jump. At the same time, the record buffer is empty enough for encoded segments to be stored during the jump, preventing the loss of data. Recording and playing between jump backs has a time period equal to the length of the pause.

Figure 7:
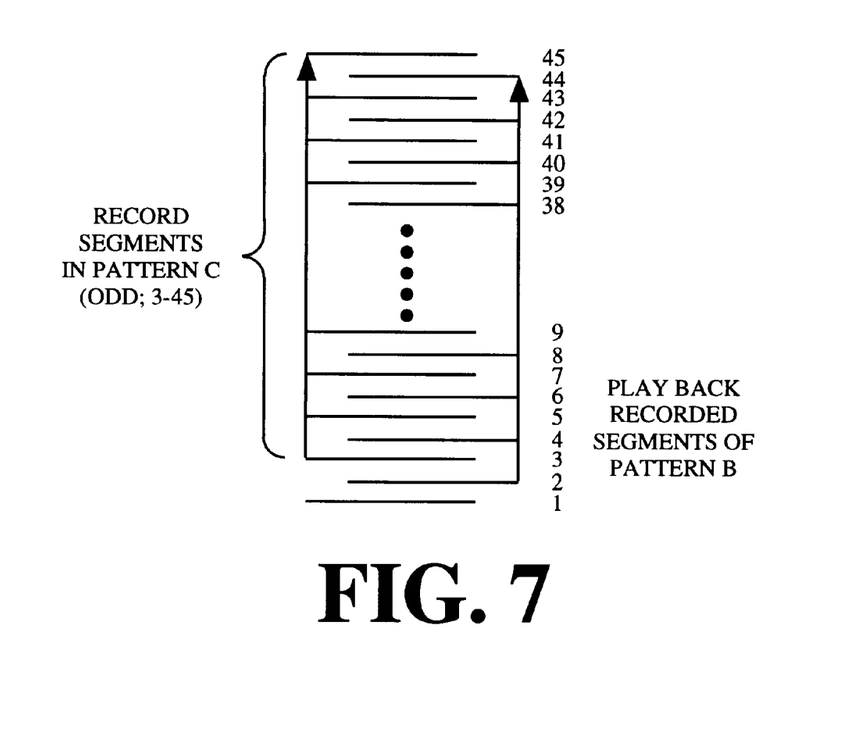
Figure 8:
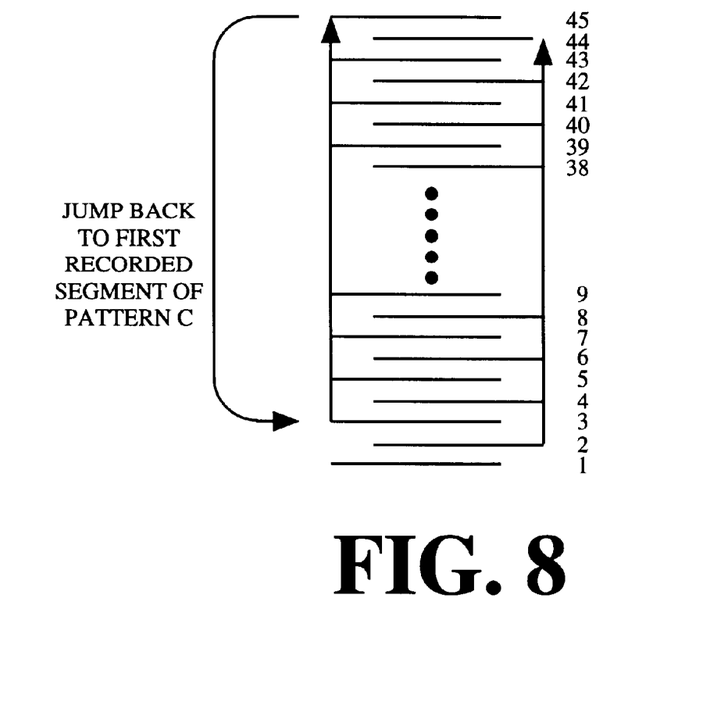
Figure 9:
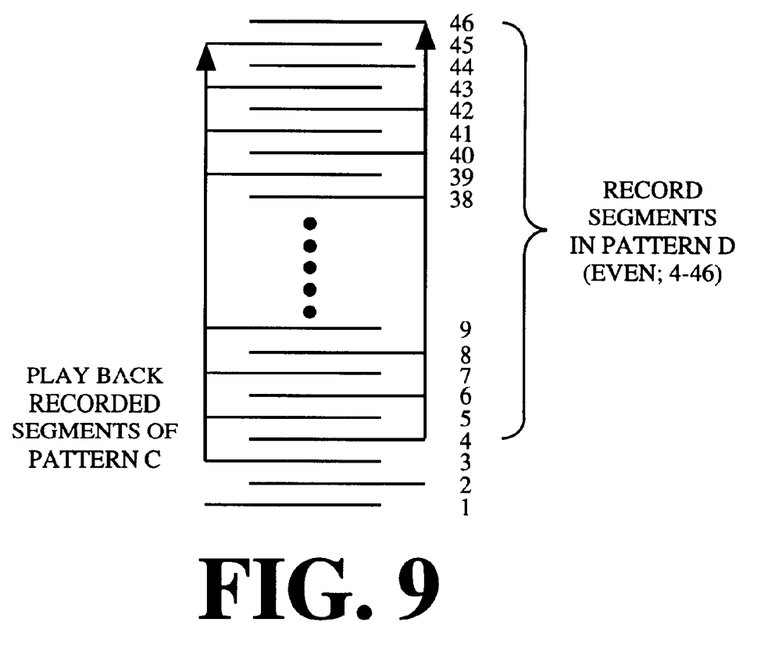

As even numbered segments 2–44 are played back, odd numbered segments 3–45 of pattern C are alternately recorded as shown in FIG. 7. After the even numbered segments 2–44 have been played back, and after the odd numbered segments 3–45 have been recorded, the pickup assembly jumps back as shown in FIG. 8 to segment 3, which is the first segment of pattern C that needs to be played back. As odd numbered segments 3–45 are played back, even numbered segments 4–46 of pattern D are alternately recorded as shown in FIG. 9.

Figure 10:
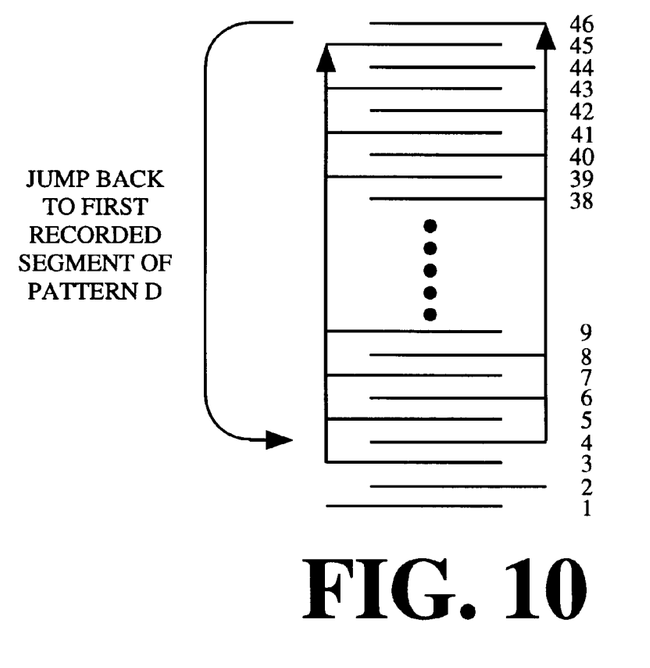
Figure 11:
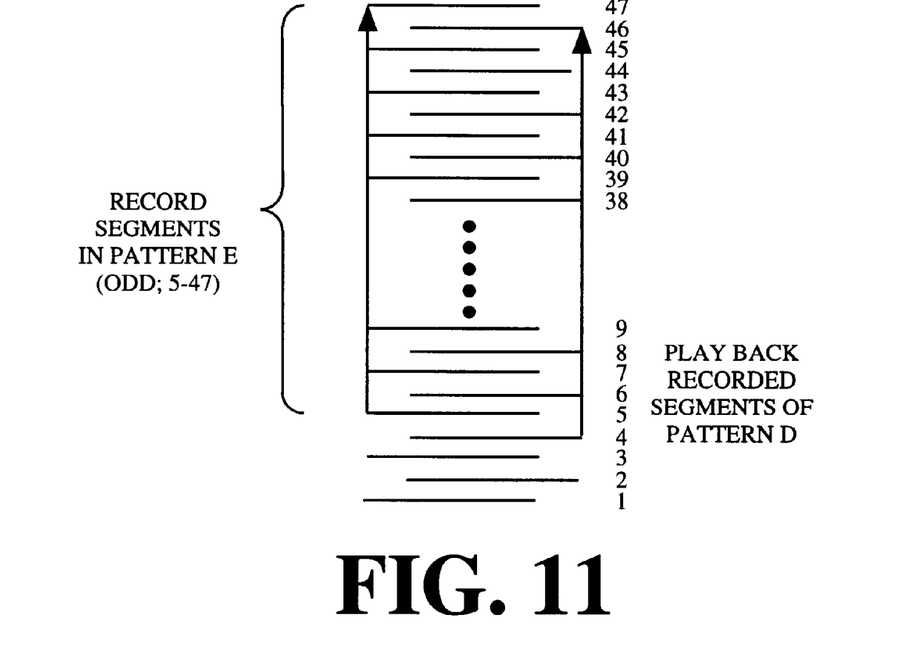
Figure 12:
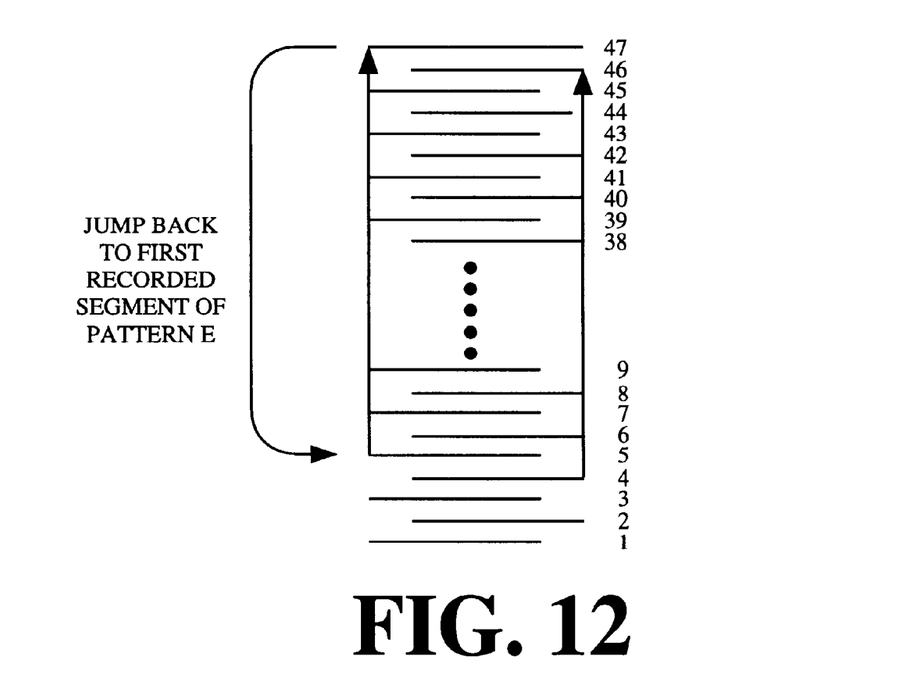
Figure 13:
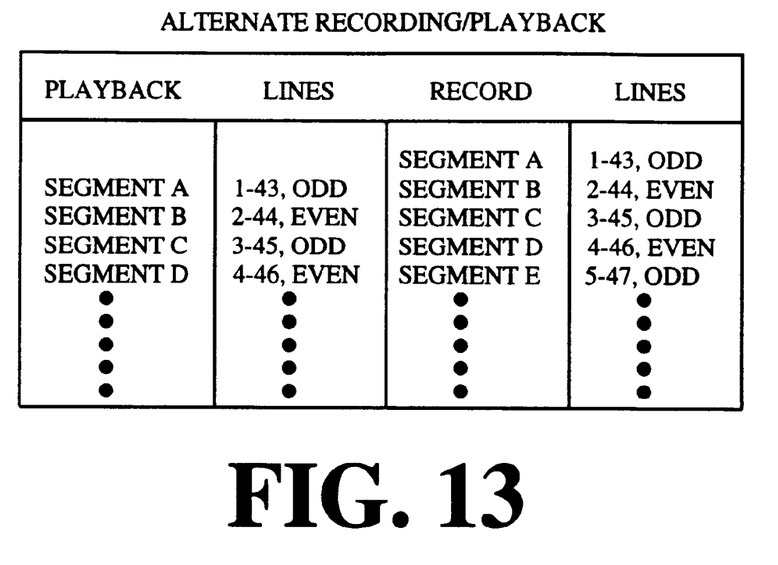
FIG. 13 is a table summarizing the alternate recording/playback illustrated in FIGS. 3–12.

After the odd numbered segments 3–45 have been played back, and after the even numbered segments 4–46 have been recorded, the pickup assembly jumps back as shown in FIG. 10 to segment 4, which is the first segment of pattern D that needs to be played back. As even numbered segments 4–46 are played back, odd numbered segments 5–47 of pattern E are alternately recorded as shown in FIG. 11. After the even numbered segments 4–46 have been played back, and after the odd numbered segments 5–47 have been recorded, the pickup assembly jumps back as shown in FIG. 12 to segment 5, which is the first segment of pattern E that needs to be played back.

After achieving steady state operation of the buffers, the process can be summarized by the steps of: after playing back the recorded segments of the first pattern, jumping back to the first recorded segment of the second pattern; and, alternately playing back the recorded segments of the second pattern and recording the program in a third pattern of segments by overwriting the segments of the first pattern.

The preceding steps are repeated for further patterns of segments until termination of the program.

It is believed that jump times as long as 0.9 seconds, for example, can be accommodated by buffers of the size noted. The time duration of the jump will include the time required for jumping as well as the time required for resynchronizing with the disk medium. Jumps after the first jump will be completed more quickly because the buffers will already be operating in the steady state condition. Accordingly, there will be no interruption of the played back material as the reading from and writing to the disk medium alternates, thus assuring a seamless presentation of the program material, wherein the recording and playing back appears to be simultaneous.

The process continues until the program presentation terminates. If the end of the track is reached before the program terminates, a routine can be provided to jump back to the beginning of the track, or any other location on the track to continue the alternate periods of recording and playing back until the program does terminate. The alternate recording and playing back is summarized in the table of FIG. 13.

Figure 15:
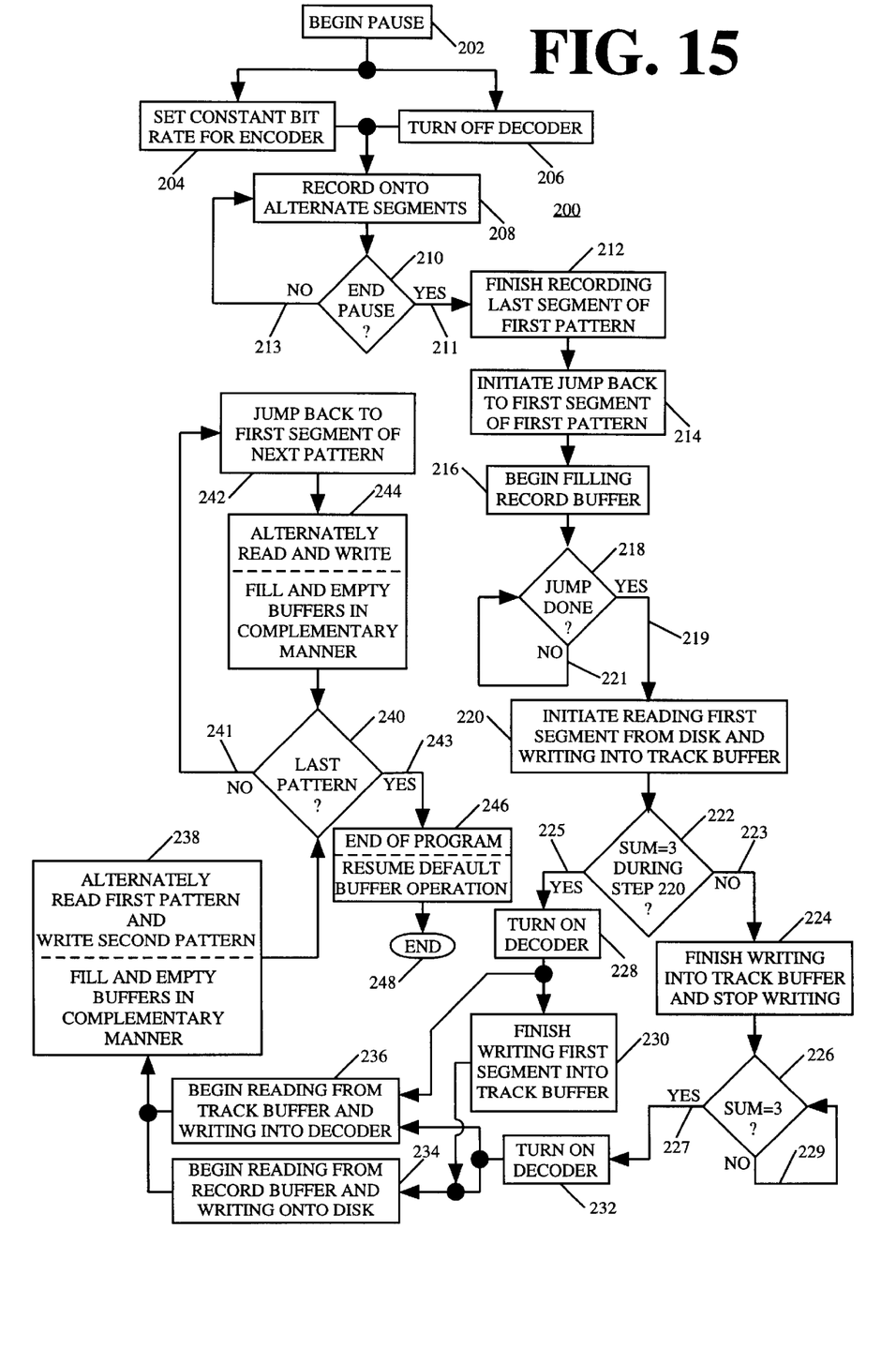
FIG. 15 is a flow chart useful for explaining buffer management for a rewritable DVD device in accordance with the inventive arrangements.

The method of operation is shown in flow chart 200 in FIG. 15, with emphasis on the buffer management. A pause begins at step 202. It is necessary to assure that the segments of the first pattern (pattern A) will be decoded at the desired constant rate, for example 5 megabits/second. It is therefore necessary to encode the segments of the first pattern at the constant bit rate because the decoder automatically decodes at the same rate at which encoding took place. Accordingly, the bit rate for the encoder is set to the desired constant bit rate in accordance with step 204. It will be appreciated that the decoder is not needed until after the pause has been terminated. Moreover, as explained more fully below, having the decoder turned off when the pause terminates can be helpful in filling the track buffer more quickly. Accordingly, it is presently preferred to turn off the decoder after the pause begins, in accordance with step 206.

The device then records a first pattern of segments onto alternate segments on the track of the disk medium in accordance with step 208. As long as the pause has not been terminated, decision block 210 returns the method to step 208 by path 213 and waits. When the pause has been terminated, the method branches on path 211 to step 212, in accordance with which the device completes recording the last segment of the first pattern. Thereafter, the pickup assembly jumps back to the first segment of the first pattern in accordance with step 214. As the jump proceeds, the record buffer begins filling with the segments that will become the second pattern, in accordance with step 216. This is necessary to assure that no incoming program material is lost during the jump.

In accordance with the inventive arrangements, the playback operation after termination of the pause is seamless. This means that once playback commences, playback can never be interrupted. Accordingly, the track buffer must never be in an underflow condition or the decoder will run out of material to decode and the playback will be interrupted. At the same time, in order to be certain that no program material is lost during recording, the record buffer must never be in an overflow condition, or the output of the encoder will have no place to be stored. The complementary management of the buffers in accordance with the inventive arrangements satisfies these operating conditions of the buffers. However, the record and track buffers must first be initialized for the complementary operation in conjunction with the first jump. Initialization is accomplished in the illustrated embodiment as soon as the sum of the number of segments in both buffers is equal to three. As soon as that occurs, the device can alternately record and playback segments in accordance with the inventive arrangements. It will be appreciated that more than one process can be implemented to achieve initialization. The initialization process described in connection with FIG. 15 is presently preferred.

As the record buffer fills, decision step 218 queries whether the jump has been completed. If not, the method branches back on path 221 and waits. When the jump is done the method branches on path 219. The pickup assembly reads the first segment of pattern A from the disk medium and the track buffer begins filling with data in accordance with step 222. The record buffer continues to be filled.

As the track buffer fills, decision step 222 queries whether the sum of the number of segments in both buffers has become equal to three during step 220, that is, before the first segment has been completely written into the track buffer. If not, the first segment will be entirely written into the track buffer. In this case, the method branches on path 223 to step 224, in accordance with which writing the first segment into the track buffer is finished, and thereafter, writing into the track buffer stops. At this instant, there is no reading from the disk or writing to the disk. Decision step 226 then queries whether the sum of the number of segments in both buffers has become equal to three after step 224, that is, while the decoder is turned off, the track buffer continues to hold only the first segment and the record buffer continues to fill. If not, the method branches back on path 229 and waits. The record buffer will eventually be filled with two segments. At this instant the sum of the number of segments in both buffers has become equal to three, and the buffers are thus initialized. The method then branches on path 227 to step 232, in accordance with which the decoder is turned back on. Thereafter, the device can begin reading from the record buffer and writing onto the disk medium, and can begin reading from the track buffer and writing into the decoder, in accordance with steps 234 and 236. After writing the first segment of the second pattern from the record buffer onto the disk medium, the second segment of the first pattern is read from the disk medium and written into the track buffer. The alternate reading and writing of the inventive arrangements is thus established.

Returning to decision block 222, it is possible that the record buffer will be filled with more than two segments, but less than three segments, before the first segment read from the disk medium is completely written into the track buffer. Whether or not this will occur depends largely on the time duration of the first jump of step 214. When this occurs, the buffers will be initialized before the first segment is completely written into the record buffer, because the sum of the number of segments in both buffers will be equal to three. Once the buffers are initialized, writing into and reading from both buffers needs to be enabled. Accordingly, and at that instant, the method branches on path 225 to step 228, in accordance with which the decoder is turned on. After turning on the decoder, it is still necessary to finish writing the first segment into the track buffer in accordance with step 230. Thereafter, the device can begin reading from the record buffer and writing onto the disk medium, and can begin reading from the track buffer and writing into the decoder, in accordance with steps 234 and 236. After writing the first segment of the second pattern from the record buffer onto the disk medium, the second segment of the first pattern is read from the disk medium and written into the track buffer. The alternate reading and writing of the inventive arrangements is thus established.

Irrespective of the process for initializing the buffers, a certain period of time is required for preparation for the next jump at a given bit rate. In the illustrated embodiment, 1 megabit/second is available for the preparation process. This period of time may not be available if the pause is too short, for example less than 10 seconds in length. One source of such a pause is accidental viewer selection of the feature. Another possible cause is viewer initiation of a second pause immediately after initialization following a first pause. Accordingly, it may be necessary to limit all pauses to a minimum duration, for example through the control program.

After steps 234 and 236, the device alternately reads the segments of the first pattern from the disk medium and writes the segments of the second pattern onto the disk medium, and fills and empties the buffers in a complementary manner in accordance with step 238. This process corresponds to FIGS. 3–5.

The complementary operation of the buffers must be understood as referring to the overall operation of the buffers and not to a condition that is necessarily maintained instantaneously, at all times. In the illustrated embodiment, during the recording onto alternate segments, the record buffer is filled by the encoder at 5 megabits/second, the chosen output rate of the encoder. If the total write to disk bit rate capability is 11 megabits/second as described, then the record buffer is being emptied at a net 6 megabits/second due to the difference between the filling and emptying rates. During the writing operation the track buffer is being emptied at 5 megabits/second, the same rate as the decoding rate. Both buffers are being emptied, so instantaneously, the sum of the number of segments in both buffers is decreasing. After the segment is written to the disk, a segment is read from the disk and written into the track buffer, also at 11 megabits/second as described. The track buffer is being emptied at 5 megabits/second. Accordingly, when the disk is being read, the track buffer is being filled at a net 6 megabits/second due to the difference between the filling and emptying rates. During the reading operation the record buffer is being filled at 5 megabits/second. Both buffers are being filled, so instantaneously, the sum of the number of segments in both buffers is increasing. Nevertheless, when the operation of the buffers is considered at the same instant in the read/write cycle, for example always at the beginning of a read or a write operation, the advantageous complementary nature of the operation is apparent.

In most cases the second pattern will not be the last pattern, but it is possible. Accordingly, decision block 240 queries whether the last pattern has been played. If not, the method branches on path 241 to step 242, in accordance with which the pickup assembly jumps back to the first segment of the next pattern that needs to be played back. After the jump, because the buffers were already initialized, the device can immediately alternately read and write, and alternately record and play back, in accordance with step 244. In accordance with the inventive arrangements, the reading and writing and the recording and playing back are implemented as the buffers are filled and emptied in a complementary manner in accordance with the inventive arrangements.

Steps 240, 242 and 244 are repeated until decision block 240 recognizes that the last pattern has been recorded and played back. The method then branches on path 243 to step 246. Step 246 notes that processing of the last pattern corresponds to the end of the program. Default operation of the buffers resumes. The method ends at step 248.

Figure 14:
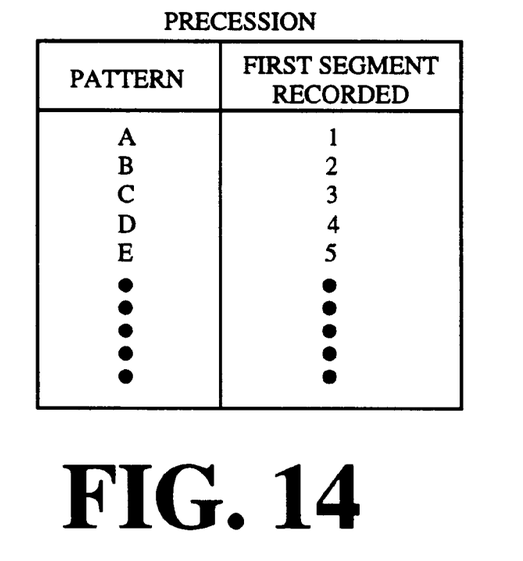
FIG. 14 is a table summarizing the precession illustrated in FIGS. 3–12.

The jumping back shown in FIGS. 4, 6, 8, 10 and 12 is summarized in the table of FIG. 14. It can be seen that the first jump is back to segment 1, the second jump is back to segment 2, the third jump is back to segment 3, the fourth jump is back to segment 4, the fifth jump is back to segment 5, and so on. Each jump back results in a re-recording or rewriting of the segments on the disk. In order to prevent premature exhaustion of the disk medium, it can be seen that the method advantageously precesses by at least one segment each time the method jumps back. The first jump back writes or rewrites onto the odd-numbered segments 1–43. The second jump back skips segment 1 and writes or rewrites even numbered segments 2–44. The third jump back skips segment 2 and rewrites odd numbered segments 3–45, and so on.

During the pause, unrecorded gaps in the track are formed between the recorded segments. It is possible to jump from the end of one recorded segment to the position on the track where the next segment is to be written. However, it is easier in most cases to simply let the disk medium spin under the pickup assembly, scanning the track until the next segment is reached.

It is often necessary to jump back one revolution of the track due to the rotational speed of the disk medium being higher than needed. Such jumps are a third kind of jump with respect to those jumps described above. Such jumps are very brief even for a DVD device, and such jumps do not require extraordinary buffer management or large buffer sizes compared to the long jumps which can be necessary for a record during record and playback (or record during pause and playback) feature.

It will be appreciated that precessing during recording of rewritable disk media is advantageous for repeated recording operations other than the record during pause and playback feature taught herein in accordance with the inventive arrangements.

Jumps of the kind described in connection with the record during pause and playback feature can be encountered in other operational conditions of a rewritable DVD device. Another mode requiring long jumps is recording a first program while viewing a second program, utilizing the same DVD. It will be appreciated that the buffer management described herein can be advantageously utilized to provide seamless operation during many kinds of program skips and other modes during simultaneous recording and playing back that require long jumps of the read/write pickup assembly.

What is claimed is:

1. A method for managing buffers in an apparatus adapted for writing program portions onto and reading said program portions from a digital program disk, comprising the steps of:
    filling a first buffer with encoded program portions at a first bit rate;
    filling a second buffer with said encoded program portions read from said digital program disk;
    supplying said encoded program portions from said second buffer for decoding; and,
    establishing a complementary fullness of said first and second buffers using an excess bit rate capability of said apparatus related to said first bit rate, wherein the sum of data in the first buffer and the second buffer is substantially constant.

2. The method of claim 1, comprising the step of setting said first bit rate as a constant bit rate.

3. The method of claim 1, comprising the step of setting said first bit rate as a bit rate slower than one-half of a maximum bit rate of said apparatus.

4. The method of claim 1, comprising the step of setting said first bit rate as a constant bit rate slower than one-half of a maximum bit rate of said apparatus.

5. The method of claim 1, comprising the step of setting said first bit rate as a constant bit rate slower than one-half of a maximum bit rate of said apparatus, whereby said excess bit rate capability is equal to said maximum bit rate less twice said constant bit rate.

6. The method of claim 1, comprising the steps of:
    filling said first buffer while emptying said second buffer; and,
    filling said second buffer while emptying said first buffer.

7. The method of claim 1, comprising the step of establishing said complementary fullness of said buffers as a constant sum of the number of program portions stored in both said buffers at the same time.

8. The method of claim 1, comprising the step of assuring said constant sum at the same instant within a cycle of each read and write cycle of said program portions.

9. The method of claim 1, comprising the step of establishing said constant sum as one-half of the total capacity of both said buffers.

10. The method of claim 6, comprising the step of maintaining said complementary fullness of said buffers during said filling and emptying steps.

11. The method of claim 6, comprising the step of maintaining said complementary fullness as a constant sum equal to one-half of the total capacity of both said buffers.

12. A method for initiating apparently simultaneous recording on and playing back from a digital program disk, comprising the steps of:
    buffering program portions before writing said program portions onto alternate segments of said digital program disk;
    buffering said program portions after reading from said digital program disk;
    upon receiving a command, jumping a read/write pickup assembly between a first and a second location spaced from one another along a track of said digital program disk;
    during said jumping, accumulating said program portions not yet written onto said digital program disk during said first-mentioned buffering step;
    after said jumping, initiating reading and accumulating at least one of said program portions read from said digital program disk during said second-mentioned buffering step; and,
    accumulating a predetermined sum of said program portions during both said buffering steps, wherein the sum of data buffered during both said buffering steps is substantially always the predetermined sum and wherein after said jumping, the read/write pickup assembly writes program portions onto and reads program portions from the digital program disk without jumping until another command is received.

13. The method of claim 12, further comprising the step of maintaining said predetermined sum of said program portions during said buffering steps.

14. The method of claim 13, further comprising the step of continuously accumulating and depleting said program portions during said buffering steps at data transfer rates consistent with said maintaining step.

15. The method of claim 12, further comprising the steps of:
    accumulating said program portions during said first-mentioned buffering step while depleting said program portions during said second-mentioned buffering step; and,
    accumulating said program portions during said second-mentioned buffering step while depleting said program portions during said first-mentioned buffering step.

16. The method of claim 15, further comprising the step of maintaining at all times said predetermined sum of said program portions during said buffering steps.

17. The method of claim 12, further comprising the step of encoding said program portions as packet stream data prior to said first-mentioned buffering step and decoding said packet stream data after said second-mentioned buffering step.

18. The method of claim 12, comprising the steps of:
    accumulating only one program portion during said second-mentioned buffering step if said predetermined sum is not attained before completing said jumping step; and, continuing said step of accumulating said program portions not yet written onto said digital program disk during said first-mentioned buffering step.

19. The method of claim 12, further comprising the step of restricting said buffering steps to complementary operation when said predetermined sum has been reached.

20. The method of claim 19, further comprising the step of alternately writing said program portions onto said digital program disk and reading said program portions from said digital program disk during said restricting step.

21. A method for alternately writing onto and reading program portions from a digital program disk to enable apparently simultaneous recording and playing back of a program, comprising the steps of:

buffering program portions before writing said program portions onto said digital program disk;

buffering program portions after reading from said digital program disk;

establishing a predetermined sum of stored program portions during both said buffering steps;

restricting said buffering steps to complementary operation; and, maintaining said predetermined sum, wherein alternately writing onto and reading program portions from the digital program disk occurs without jumping until a jump command is received.

22. The method of claim 21, wherein said step of restricting said buffering steps to complementary operation comprises the step of continuously accumulating and depleting said program portions during said buffering steps at data transfer rates consistent with said maintaining step.

23. The method of claim 21, wherein said step of restricting said buffering steps to complementary operation comprises the steps of:

accumulating said program portions during said first-mentioned buffering step while depleting said program portions during said second-mentioned buffering step; and, accumulating said program portions during said second-mentioned buffering step while depleting said program portions during said first-mentioned buffering step.

24. An apparatus for alternately writing onto and reading program portions from a digital program disk during apparently simultaneous recording and playing back, the apparatus comprising:

a first signal processing path for receiving and encoding said program;

a read/write pickup assembly for writing encoded program data onto said digital program disk and reading encoded program data from said digital program disk;

a servo system for said pickup assembly;

a second signal processing path for decoding and playing back said encoded program;

a first buffer for storing encoded program portions ready to be written onto said digital program disk;

a second buffer for storing encoded program portions read from said digital program disk; and, a controller having a first mode of operation for recording said program portions onto alternate segments of said track, during which said first buffer is free running, a second mode of operation for initiating complementary operation of said first and second buffers during and after a jump by said pickup assembly and a third mode of operation for maintaining said complementary operation, wherein said complementary operation requires the sum of data in the first buffer and the second buffer to remain substantially constant and wherein the pickup assembly does not jump during said third mode of operation.

25. The apparatus of claim 24, wherein for said complementary operation a predetermined sum of program portions stored in said buffers is established during said second mode of operation and maintained during said third mode of operation.

26. The apparatus of claim 24, wherein:

said first signal processing path comprises means for encoding said program as packet stream data prior to being stored in said first buffer; and, said second signal processing path comprises means for decoding said packet stream data after being stored in said second buffer.

27. The apparatus of claim 24, wherein:

said first signal processing path comprises means for encoding said program as blocks of packet stream data prior to being stored in said first buffer; and, said second signal processing path comprises means for decoding said blocks of encoded packet stream data after being stored in said second buffer.

28. The apparatus of claim 25, wherein said controller continuously fills and empties said buffers at data transfer rates consistent with maintaining said sum during said third mode of operation.

29. The apparatus of claim 25, wherein during said third mode of operation, said first buffer fills as said second buffer empties and said second buffer fills as said first buffer empties, at bit rates consistent with maintaining said sum during said third mode of operation.

* * * * *